Oct. 1, 1935.  W. J. KERR  2,015,855
AUTOMATIC CONTROL SYSTEM
Filed Sept. 27, 1934  2 Sheets-Sheet 2
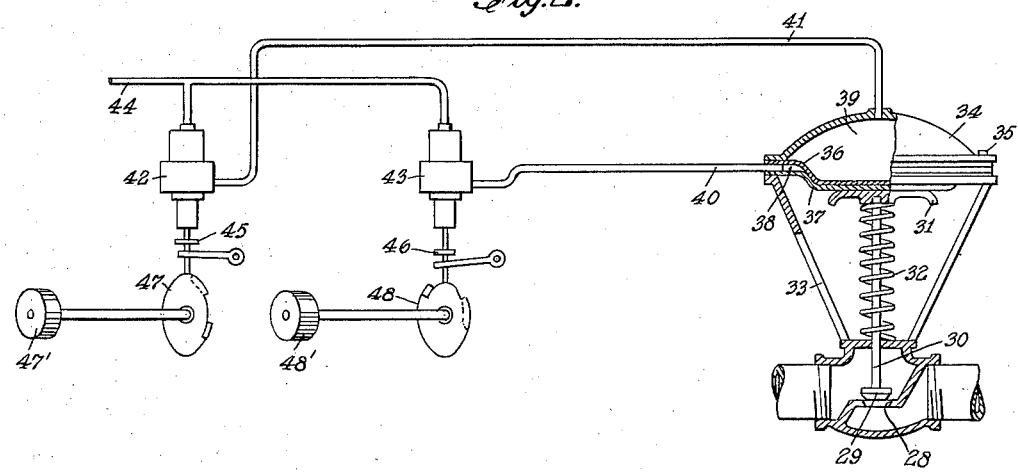
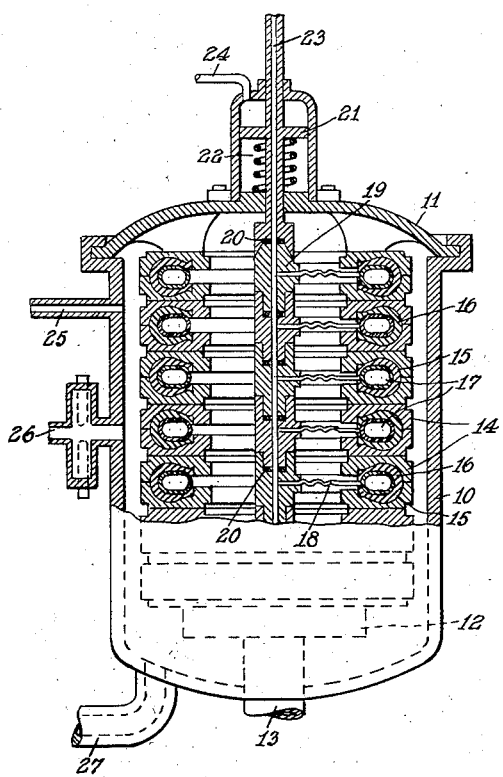
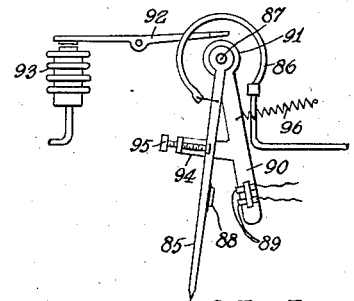
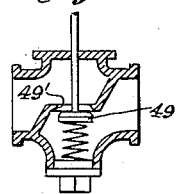
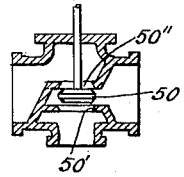
INVENTOR
WILLIAM J. KERR
BY
ATTORNEY

UNITED STATES PATENT OFFICE 2,015,855

AUTOMATIC CONTROL SYSTEM

William J. Kerr, Waterbury, Conn., assignor to The Bristol Company, Waterbury, Conn., a corporation of Connecticut Application September 27, 1934, Serial No. 745,764

14 Claims. (Cl. 18—17)

This invention relates to automatic control systems, and more particularly to systems of that type wherein a discontinuous process, such as the curing of rubber articles, is carried out and made wholly or partially automatic through the agency of fluid-actuated valves and interlocking devices actuated by means of electrically driven, pneumatic process-cycle-control instruments.

In the curing of automobile tires and the like, a well known system embodies the use of "pot heaters", wherein a considerable number of metal molds containing the articles to be cured are compressed by hydraulic means and exposed to the action of a heating agent, such as steam, for a predetermined time, after which the molds are cooled by a spray of water and released for opening and for removal of the contents.

In order that the product be of the best quality and uniform in its nature it is essential that the various heating and cooling events constituting the cycle be carried out according to a prearranged cycle or schedule, and that the relative timing of these events be invariable as successive cures of similar batches are put into effect.

It is important, moreover, that certain conditions which may develop after the molds have been closed should be made apparent to the operators at times during the cycle, so that they may be used as a guide to succeeding steps in the process.

It is also desirable that in the event of failure of any of the services—hydraulic, pneumatic or electric—there be introduced conditions leading to a minimum probability of hazard to operators or to equipment or of damage to material in process.

As these heaters are generally operated in a "gang", with a crew of operatives passing from unit to unit, any disturbance of the cycle, as by the premature or delayed opening of one of the heaters, may seriously disrupt the working schedule and occasion waste not only of time but also of material.

It is the object of this invention to provide a control system for "pot heaters" and the like, which shall embody means for effecting the above-mentioned desirable conditions, and which shall at the same time be relatively simple, practical and positive in operation.

In carrying out the control, an initiatory period is provided for in which, after the heater has been loaded with molds containing, for example, a batch of "green" tires and "bags" for inflating the same, air is admitted to the said bags; and subsequently steam is admitted to the heater.

When the temperature of the heater has attained the required degree, a processing period is provided for in which the temperature is maintained for the period of the cure. Provision is made, however, for test during the processing period of the air pressure prevailing within the bags, so that if any objectionable leakage has occurred, the subsequent cycle of operations may be modified and manually controlled.

At the termination of the cure, a period of restoration is initiated which involves the shutting off of the steam, the application of cooling water to the heater for cooling the molds, discontinuing the supply of air to the bags and dismantling of the mold structure and removal of the contents of the heater.

Provision is also made to close automatically the several air and steam lines to the heater in the event of failure of air pressure in the control system, and likewise with failure of the supply of electric current.

The nature of the invention, however, will best be understood when described in connection with the accompanying drawings, in which:

Fig. 2 shows diagrammatically certain valve and controller combinations which are embodied in the invention.

Fig. 3 is a detail elevation, partly in section, showing the arrangement of the molds and associated parts within the heater.

Fig. 4 is a detail fragmentary view of a part of the interior mechanism of one of the instruments employed.

Figs. 5 and 6 are vertical sections of different types of valves utilized in the novel control system.

Figure 1:
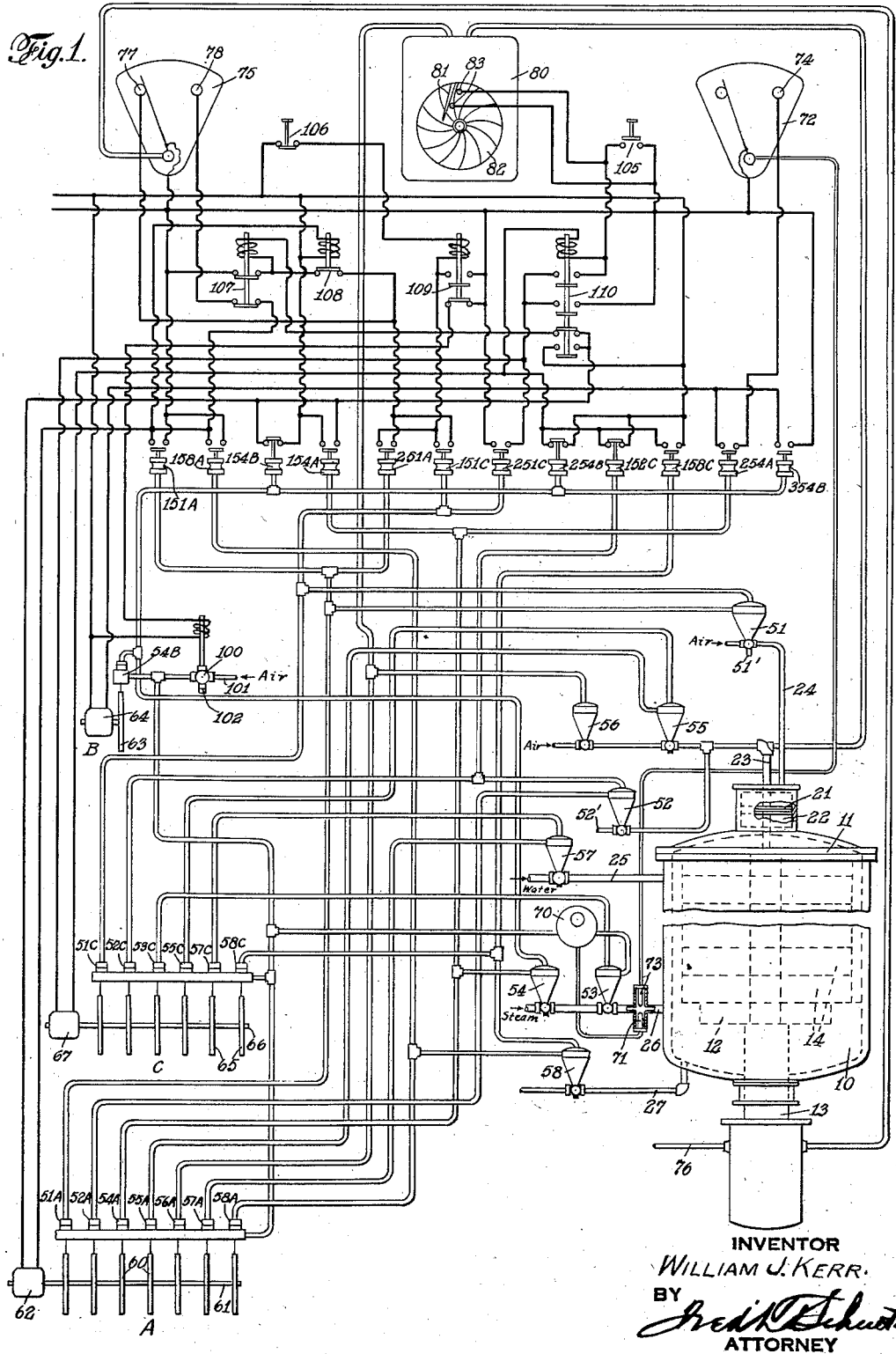
Fig. 1 is a diagrammatic representation of a complete control system embodying the invention, all parts being shown as in an inactive condition.

Referring to the drawings, 10 designates a tire vulcanizer of the type known as a "pot heater", having upon its upper end a removable cover member 11, and within its lower part a movable platen 12, adapted to be raised or lowered by the action of a hydraulic ram 13. Upon the platen 12 are stacked in relative vertical disposition a series of sectional molds 14 having within their masses cavities 15 adapted to contain automobile tires or the like 16 under the process of curing. The relative disposition of the cover member 11 and the platen 12 is such that when a predetermined number of molds are placed upon the latter and the cover closed and secured in place, as by bolting or clamping, the platen may be raised, tending to compress the tire molds 14 together and hold them securely in place.

Within each of the tires 16 is placed a "bag" 17, adapted to contain air or other fluid under pressure, thereby distending the tire into the mold and causing it to conform to the pattern thereof during the process of curing.

Pressure is communicated to the interior of each bag by means of a flexible tube 18 connected to a "header T" 19 so that a series of T's, one to each mold, may be built up, having gaskets 20 between, and compressed into a unit by action of a piston 21 in a cylinder 22 carried by the cover member 11. Thus, there is constituted a manifold or header, by which air or other fluid medium from a supply pipe 23 may be conducted to the interior of the bags; but this element of the device forms no part of the present invention.

While a variety of piping connections and valve arrangements may be used within the scope of the invention, there is shown a grouping which may be considered as typical of a system applicable to the curing of automobile tires.

In addition to the pipe 23 already mentioned as forming a connection to the interior of the bags, a pipe 24 serves to conduct air or other fluid to the cylinder 22; a pipe 25 furnishes a supply of cold water for spraying down the molds; a pipe 26 leads steam to the interior of the pot heater for the purpose of maintaining a suitable high temperature during the cure; and a pipe 27 serves to vent the accumulated spray water and condensate to the drain.

In the above-mentioned pipe lines are installed a number of pneumatically operated valves, as will hereinafter be described; and these valves are adapted to be actuated by timing means in the form of cycle controllers, with the interlocking of whose action this invention is primarily concerned.

The pneumatically operated valves are of the type known as "diaphragm-motor-operated" valves (more briefly known as "diaphragm" valves) in which the valve stem is actuated by air pressure applied to a flexible diaphragm against the thrust of a spring. These valves, shown in Fig. 2, are classified as "direct-acting", in which the application of air pressure to the diaphragm tends to close the valve, as indicated; "reverse-acting", Fig. 5, in which air pressure tends to open the valve; and "three-way", Fig. 6, which under air pressure tends to supply a fluid to a space, and when released vents that space to the atmosphere. Also, a number of the valves employed are of the "double-top" type, Fig. 2, in which there are two diaphragms, forming two non-communicating chambers, so that the admission of air into either of them from independent sources will tend to actuate the valve, and both to actuate it in the same sense.

With respect to the cycle controllers, each embodies a shaft having thereon adjustable cams, a shaft being driven from a small constant-speed motor as of the well-known A. C. clock type, and each cam being adapted to actuate through a tappet, a pilot valve, which may be of the type set forth in U. S. Patent #1,890,494 granted December 13, 1932, controlling in turn the supply of air to one or other of the diaphragm tops of the diaphragm valves.

A diagrammatic representation of the combination of two cycle controllers with a double-top valve is given in Fig. 2, where there is indicated a valve of the double-top direct-acting type, having a seat 28 and a seating member 29, the latter carried on the lower extremity of a stem 30. Upon the upper end of the stem 30 rests a "saucer" 31; and surrounding the stem is a helical spring 32, adapted to resist the tendency of the stem and saucer to move downwards under the influence of the diaphragm.

Carried by the valve body is a structure comprising a spider 33 bearing a dome-shaped top 34, attached thereto as by bolts 35. Interposed between the top 34 and the spider 33 are two diaphragms 36 and 37 of flexible sheet material such as rubberized fabric, there being a space 38 between the two diaphragms and a space 39 between the upper diaphragm and the domed top 34. This structure comprises the valve motor.

Air may be admitted to the valve motor by either a pipe 40 entering the space 38, or a pipe 41 entering the space 39. It will be seen that air pressure in either of these chambers will cause a downward pressure to be exerted on the saucer 31, forcing the seating member 29 into engagement with the seat 28 and closing the valve.

Two pilot valves 42 and 43 are arranged to receive compressed air at a relatively low pressure (say 15 lbs. per sq. in.) from a common supply line 44 and to control respectively its admission to the pipes 41 and 40. The valves are adapted to be actuated by tappets 45 and 46 respectively, which in turn are operated by cams 47 and 48 respectively, driven at constant speeds by motors represented at 47' and 48', each forming an element in a cycle control instrument. With the valve 42 held in its open position, as shown in the drawings, air will be admitted to the chamber 39, operating the valve seating member 29 irrespective of the position of the pilot valve 43. Similarly, if pilot valve 43 be opened by action of cam 48, air will be admitted to the chamber 38 and the valve member 29 seated as before; so that, if either or both of the pilot valves be opened, the direct-acting valve will be closed, it being necessary, in order to cause the valve to be opened, that both the pilot valves 42 and 43 be closed.

The body arrangement of a reverse-acting valve operating on the same general principle but in a reverse sense is shown in Fig. 5, the movable seating member 49 being on the opposite side of its seat 49'; and that of a three-way valve in Fig. 6, in which the seating member 50 is located between the two seats 50' and 50''.

As indicated in Fig. 1, a double-top three-way valve 51 is inserted in the pipe 24 and operates in such a manner that when pressure is upon either of its diaphragms air from the supply will be admitted to the cylinder 22, and when pressure is released from both diaphragms the supply will be cut off and the cylinder will exhaust to the atmosphere through the outlet 51'. A double-top direct-acting valve 52 communicating with the pipe 23 serves to exhaust air from the bags to the atmosphere through the outlet 52'. A double-top direct-acting valve 53 and a double-top reverse-acting valve 54 are connected in series with each other in the steam line 26. A double-top reverse-acting valve 55 and a single-top direct-acting valve 56 are similarly connected in series with each other in the air line to the pipe 23 supplying the bags. A double-top reverse-acting valve 57 controls admission of water to the pipe 25 for spraying down the molds; and a double-top reverse-acting valve 58 controls the drainage of the apparatus through the pipe 27.

The diaphragm tops of the above-mentioned valves are supplied with air through pilot valves as above set forth, these forming elements in three cycle control instruments "A", "B", and "C".

The cycle controller "A" comprises a plurality of pilot valves 51A, 52A, 54A, 55A, 56A, 57A and 58A actuated from individual cams 60 adjustably mounted on a common shaft 61 and driven at a constant speed by a motor 62.

The cycle controller "B" comprises a single valve 58B and cam 63, driven by a motor 64.

The cycle controller "C" comprises a plurality of valves 51C, 52C, 53C, 55C 57C and 58C with cams 65 mounted on a common shaft 66 and driven by a motor 67—each pilot valve of the foregoing being numbered according to the diaphragm valve which it controls, while it is lettered according to the control instrument of which it forms a part.

For the purpose of obtaining the interlocking action which characterizes this system of control, there is provided a group of pneumatic-pressure-electrical switches, adapted to control electrical circuits concurrently with the application and removal of air pressure in the pipes supplied through the several cycle-controller pilot valves. The pneumatic switches 151A, 158A, 154A, 251A and 151C, 251C, 158C, 254A and 354B are adapted upon application of air pressure to close their contacts to complete electrical circuits; and the switches 154B, 254B and 152C to open their contacts upon the application of air pressure.

Diaphragm valve 53, in addition to being subject to actuation by air pressure from the cycle controller C, through the pilot valve 53C, is also controlled by a temperature regulator 70, which may be of the type disclosed in U. S. Patent #1,880,247, granted October 4, 1932, and which, throughout the duration of the cure, serves to maintain within the body of the pot heater any desired predetermined value of temperature, as measured by a sensitive bulb 71.

A temperature regulator 72, which may be of the type set forth in U. S. Patent #1,225,758, granted May 15, 1917, is arranged to respond to variations in temperature of a sensitive bulb 73 in immediate juxtaposition to the bulb 71, and to close its electrical contact 74 when the measured temperature rises to a predetermined value corresponding to that which has been found suited to the process under control.

A pressure regulator 75 of the type similar to the regulator 72 is arranged to respond to hydraulic pressure in the line 76 supplying the ram 13, and is fitted with a low contact 77 and a high contact 78, each being adjustable to a predetermined setting.

A pressure recording instrument 80, having a marking member or index 81 adapted to make upon a movable chart 82 a record of air pressure within the bags, is piped to the air line 23 which carries the inflation pressure of the bags. This instrument may be fitted with contacts 83 completing an electrical circuit when the pressure in the bags falls more than a predetermined amount below the initial inflation pressure. Such action may be effected by a device such as that shown in Fig. 4. The index or pen-arm 85 thereof is actuated by a Bourdon tube 86 or its equivalent about a shaft member 87, and carries an insulated bridge piece 88 adapted to close the contacts 89 when the index is in its low position. Carried free on the shaft 87 is a floating member 90 bearing the contacts 89 and having a surface 91 adapted to be engaged by a brake member 92 actuated by a pressure element 93 piped to the control line supplying the diaphragm valve 56 in Fig. 1. A projecting arm 94 on the floating member 90 is provided with an adjustable stop 95 adapted to engage the index 85, while a light spring 96 tends to urge the floating member to its low position.

Furthermore, a solenoid-actuated valve 100, having a three-way body, is connected in the main air line 101 to the control system, so as to place the system in communication with the supply line when the solenoid is carrying current, and to vent the system to the atmosphere when the coil is de-energized, as through the outlet 102.

A normally open push-button switch 105, which may have its contacts connected in parallel with the contacts 89 in the instrument 80; a normally closed push-button switch 106; and relays 107, 108, 109 and 110, all having contact arrangements and connections as set forth in the diagram of Fig. 1, serve to complete the interlocking system, whose performance will hereinafter be set forth.

*Operation*

The cycle of events, as carried out by the control system hereinbefore described is as follows:

With no hydraulic pressure on the ram 13, the contact 77 in the controller 75 stands closed, allowing a circuit to be completed through the contacts of relay 108, the coil of relay 107, the contacts of relay 110 and the contacts of pneumatic switch 154B, thus energizing the relay 107, which, through its upper contacts, serves to bridge the contact 77, thus locking both sets of contacts in this relay in the closed position. The relay 109, being de-energized, stands with its lower contacts closed, so that voltage is applied to the solenoid valve 100, holding the valve in its open position, and making control air available to the pneumatic system.

The pot heater having been loaded with its quota of molds, each containing a "green" tire containing a "bag", the tube 18 from each bag is connected to its corresponding header T 19; and the cover 11 is placed on top of the heater and securely bolted or clamped in position. The operator, then, through means not shown in the drawings, causes hydraulic pressure to be applied to the ram 13, raising the platen 12, which brings the molds into intimate contact and makes it impossible for them to be forced apart by internal pressure in the bags 17.

As the platen comes to a firm bearing on the molds and all lost motion is taken up, the pressure in the hydraulic system will rise, causing the contact 77 to open; but, this contact being bridged by the contacts of relay 107, no immediate effect is produced.

As the hydraulic pressure continues to rise, the contact 78 will eventually be closed; and thus the purely automatic feature of the cycle is initiated.

*Start of cycle*

Electric current will pass through the contact 78, the lower contacts of relay 107, the motor 62 and the contacts of pneumatic switch 154B, causing the cycle controller "A" to start rotating its cam shaft 61. At the same time the relay 108 will be energized and its contacts opened, so that in the event of contact 78 being opened the relay 107 will become de-energized.

Immediately after the starting of the cycle controller "A", its cam action will cause the pilot valve 51A to be opened, and pressure thereby applied to the diaphragm valve 51, thus admitting air through the pipe 24 to the cylinder 22 to force down the piston 21 and compress thereby the header T's 19 and their gaskets 20 into a compact unit. The whole stack is thus formed into a manifold, whereby air may be admitted through the tubes 18 into the bags 17 to inflate them within the uncured tires. The air pressure with which the bags are inflated will be measured and recorded by the instrument 80.

The opening of pilot valve 51A will also cause pressure to be applied to the pneumatic switches 151A and 251A, closing their electrical contacts. The action of switch 151A in closing its contacts is to bridge the contact 78 and the lower contacts of the relay 107, which are normally in series so that should either of these contacts be opened, the motor 62 and the relay 108 will remain energized. The action of switch 251A is to provide through its contacts an alternative circuit for the coil of relay 109, so that should the contact 77 in the controller 75 close due to failure of hydraulic pressure the relay 109 will be energized, opening its lower contacts and at once allowing the solenoid valve 100 to close, cutting off the supply of air to the control system.

A short time after the opening of pilot valve 51A, the pilot valve 52A will be opened by the corresponding cam in the cycle controller "A", applying pressure to the direct-acting diaphragm valve 52 and closing the exhaust from the bags. The cycle controller "A" will then act to open successively the pilot valves 54A and 55A, applying thereby pressure to the diaphragm valves 54 and 55, respectively, thus admitting steam to the shell of the pot heater through pipe 26 and air for inflating the bags through pipe 23. Pressure from the valve 54A will also be applied to the pneumatic switches 154A and 254A, the former bridging the contacts of switch 154B, which are in series with motor 62 of cycle controller A, and the latter connecting the contact 74 of the controller 72 into circuit.

Steam entering the shell of the pot heater will cause the temperature therein to rise, until it reaches the predetermined curing value, as set on the regulator 70, at which temperature it will be held as the cure proceeds. At the same time, the temperature controller 72 will close its contact 74, causing current to pass through the contacts of pneumatic switch 254A to the motor 64 of cycle controller B.

As this controller starts, its single cam 63 will open pilot valve 54B, admitting air pressure to the upper diaphragm of the steam valve 54, thus maintaining the cure, whether or not pressure from pilot valve 54A remains available. Three pressure switches 154B, 254B and 354B will also be actuated, with the following effects on the electrical circuits: The contacts of switch 154B, in parallel with those of 154A, will be opened, thus transferring the operating current of motor 62 to the latter. The contacts of switch 254B, in parallel with those of switch 158C, will be opened. The contacts of switch 354B will be closed, thus bridging the contacts 74 in the controller 72.

*The bag test*

After the cure has proceeded for several minutes, the exact time depending upon various conditions, which form no part of the present invention, and being established by the setting of the cams in the cycle controller A, the pilot valve 56A will be opened, and held open for a definite time, approximating one minute. This will cause pressure to be applied to the diaphragm valve 56, causing it to close and entrap in the bag system the air with which the bags are inflated. Any leaks which may exist in the bags or their connections, including the stack of header T's 19, constituting the manifold, will then cause the pressure of the entrapped air to fall; and this drop will be shown on the instrument 80. The record, as exhibited on the chart 83, may be scrutinized by the operator in charge; and if the pressure decrease due to leakage during the time the valve 56 is closed does not exceed a predetermined permissible amount, conditions will be considered as normal, and the cure allowed to proceed to its normal termination. In the event of the rate of pressure drop due to leaks being abnormal, as indicated on the chart, the operator may manually actuate the switch 105, modifying the cycle of operations as will hereinafter be explained.

If automatic operation of the modifying means is preferred, the action is as follows: As the bag pressure rises, the index 85, of a type of recorder as indicated in Fig. 4, will engage the stop 94, which has previously been adjusted to a predetermined setting, forcing the floating member 90 to travel in a direction corresponding to increasing pressure, and in opposition to the influence of the spring 96. As the valve 56A is opened, to apply the bag test, pressure will be admitted to the pressure element 93, causing the braking member 92 to engage the surface 91 on the floating member 90, and clamping the same in its position of maximum excursion. As the pressure of the entrapped air in the bags falls, due to leakage, the index 85 will move down the scale, and the bridge piece 88 will approach the contacts 89. If the rate of pressure drop is such as to permit these contacts to be closed before the member 90 is released by readmission of air to bellows 93, the cycle will be modified as though the switch 105 had been manipulated. When the pressure in the line to the valve 56 is relieved, the brake member 92 will be released, whereupon the spring 96 will be free to return the floating member 90 to engagement with the index 85.

The valve 56A is actuated by a cam having on its surface a series of several successive similar sets of serrations (not shown), so that the bag test will be repeated several times during the earlier part of the cure, and the general trend of conditions in the heater thus made manifest.

*The cure*

After completion of the bag tests, and assuming that a normal condition has been indicated, the pilot valve 54A will be closed, relieving pressure in the lower diaphragm of valve 54, which valve, however, will still be maintained in its open position by pressure from the pilot valve 54B, as hereinbefore set forth.

As the pilot valve 54A closes, the pressure switches 154A and 254A will open their contacts, the former interrupting the current supply to motor 62 and bringing the controller A to rest, and the latter clearing the circuit of contact 72, which will now be bridged by the switch 354B. The opening of switch 154A will also de-energize the relay 107. This condition will now hold without change until the termination of the time allowed for the cure, as established by the setting of the single cam 63 in the cycle controller B.

*Normal termination of cure*

As the cure period set up on the cam 63 of controller B is terminated, this cam will cause the pilot valve 54B to close, relieving pressure on the valve 54, which will serve to shut off steam from the shell of the pot heater. The pneumatic switch 154B will also close its contacts, serving to energize the motor 62 and re-start the cycle controller A; and switch 254B will close its contacts, while switch 354B will open its contacts, interrupting the current supply to the motor 64 and bringing the cycle controller B to rest.

As the controller A resumes action, pilot valve 57A will be opened, applying pressure to the diaphragm of valve 57 and admitting cold water for spraying down the molds in the pot heater; and within the ensuing minute the pilot valve 53A and the valve 58 are similarly actuated, opening the interior of the shell of the pot heater to the drain. Air from pilot valve 58A serves also to close the contacts of pressure switch 158A, paralleling the contacts of switch 151A in series with the motor 62.

After a lapse of from one to two minutes the pilot valve 57A will be closed, causing the spray water to be shut off by the valve 57. At the same time pilot valve 55A will be closed, allowing the valve 55 to shut off the supply of inflation air. A few seconds later pilot valve 52A will close, allowing the air to exhaust from the bags through the valve 52. About two minutes later, allowing time for the bags to deflate to a safe pressure, the pilot valve 51A will be closed, causing valve 51 to shut off the air supply to cylinder 22, and allowing that within the cylinder to exhaust through the outlet 51' of the three-way valve, thus releasing pressure on the header T's 19. At the same time pneumatic switch 151A will open its contacts, which are now bridged by those of pneumatic switch 158A, and pneumatic switch 251A also will open its contacts.

While hydraulic pressure may now be taken off the ram 13 and the shell of the heater opened, the controller A will continue in operation for several minutes until the pilot valve 58A closes, shutting off the drain valve 58. At the same time the pneumatic switch 158A will open its contacts, releasing the relay 108, and also interrupting the current supply to the motor 62, bringing the cycle controller A to rest in its original position, and thus completing the cycle in a normal manner.

*Modified (or "rejection") cycle*

In the event of leaks made manifest by the bag test necessitating modifications in the cycle as above set forth, either the switch 105 or the contacts 83 will be closed in a manner already explained, completing the circuit of the relay 110 through the switch 152C. Through its upper and middle contacts, as shown on the diagram, relay 110 will lock itself to the line, so that it will not be released upon opening of the contacts 83 or the switch 105.

Opening of the lower contacts of relay 110 serves to release the relay 107. However, a circuit will be completed through the contacts of relay 110, the motor 67 and the switch 152C, starting the cycle controller C. Immediately upon the starting of this controller the pilot valve 51C will be opened, applying pressure in the upper diaphragm of valve 51, thus maintaining an air supply to the cylinder 22, whether or not pressure is applied in the lower diaphragm of the valve.

Pneumatic switches 151C and 251C operate to close their contacts under the supplied air, the former acting in parallel with switch 251A to provide an alternative circuit through which relay 109 may be energized by contact 77, with results as hereinbefore set forth, and the latter to maintain a power supply to the motor 64 in the event of release of the relay 110.

At the same time, the pilot valve 53C will be opened, applying pressure to the upper diaphragm of the regulating valve 53 and shutting off the steam supply in the shell of the heater. Pilot valve 57C will then be opened, applying pressure to the upper diaphragm of valve 57, thus admitting water to spray down the molds. After a short time, allowed for filling the shell of the heater, the pilot valve 58C will be opened, causing the valve 58 to open and drain off the spray water and the condensate. Pneumatic switch 158C will close its contacts; and at the same time pilot valve 55C will be opened, applying pressure to the upper diaphragm of valve 55, holding this valve open, and preventing premature deflation of the bags. Pilot valve 52C will now be opened, applying pressure similarly to the upper diaphragm of exhaust valve 52, holding it closed; and pneumatic switch 152C will be actuated in a sense to open its contacts, transferring the running current of motor 66 to the contacts of switch 158C.

In the meantime the cycle controller B will have continued to operate, holding the steam valve 54 open; though, because of the valve 53 having been closed as the controller C took up the cycle, the cure will not have been progressing. The contents of the heater, on the other hand, will have been subjected to a continuous cooling action, the tires remaining inflated in the molds. It has been found that with this method of interrupting or suspending the cure, the tires are not spoiled as they might otherwise be; and after suitable adjustments or repairs have been made to the bag system, the same tires may be subjected to a normal curing process.

The cycle controller A will have continued during this period to operate (though most of its effects upon the diaphragm valves will be dominated by controller C) and, as above set forth, will in time cause the pilot valve 54A to close, relieving pressure in the lower diaphragm of valve 54 and also in the pneumatic switches 154A and 254A. While switch 154A will open its contacts, these will have been bridged by the lower contacts of the relay 110, so that the motor 62 will not come to rest as in the normal cycle, but will continue to operate, allowing the controller A to run until the pilot valve 58A closes, relieving pressure in the pneumatic switch 158A, thus releasing the relay 108 and at the same time stopping the motor 62 with the cam shaft of the controller A in its normal starting position. This, however, owing to the dominance of controller C, will not release the bag pressure; and the cycle will continue until the sequence of events is brought to a termination by the action of the latter instrument.

After a time lapse approximating 20 minutes from the opening of the spray valve 57 by action of the pilot valve 57C, and under any circumstances a considerable time after the controller A has run to its starting position and come to rest, the pilot valve 57C will be closed, shutting off the spray by means of the valve 57; and a few minutes later, allowing the shell time to drain, the valve 58C is closed, shutting the drain valve 58, and also causing the contacts of pneumatic switch 158C to open to bring the controller C temporarily to a stop.

The cycle controller B will continue to run through its predetermined time, until the valve 54B closes, relieving pressure on the diaphragm valve 54 and allowing it to close. At the same time the pneumatic switch 154B will close its contacts; but the cycle controller A, having already run to its starting position and stopped with the switch 158A open, the motor 62 will not receive current, and controller A will remain at rest.

Switch 354B will open its contacts, bringing the controller B to rest in its normal starting position; while switch 254B will close its contacts, re-establishing a circuit through motor 66, and causing controller C to resume its cycle.

As controller C starts, the pilot valve 55C acts to close the valve 55, shutting off the supply of air to the bags; and a few seconds later pilot valve 52C relieves pressure in the diaphragm of valve 52, allowing the air in the bags to exhaust to the atmosphere. During this part of the cycle the pilot valves 55C and 53C will relieve pressure on the diaphragms of valves 55 and 53, allowing them to open in preparation for the succeeding cure.

After a lapse of about two minutes from the opening of the exhaust, allowing time for the bags to deflate to a safe pressure, pilot valve 51C will be closed, actuating the three-way valve 51 to shut off air from cylinder 22 and vent it to the atmosphere, thus releasing pressure on the header T's 19.

At the same time, pressure is released in the pneumatic switches 151C and 251C, the former acting to open the alternative circuit provided for the relay 109, and the latter to de-energize motor 66, bringing the cycle controller C to rest in its starting position, and also to de-energize relay 110, thus restoring the whole system to the condition for initiating a new cycle of operations.

The net result of the superimposition of the action of the cycle controller C upon the cycle as a whole will thus have been to terminate the actual curing process, and maintain the contents of the molds in a relatively inert condition until the normal time for opening the heater, as determined basically by the setting of the controller B.

This makes it possible for the attendants to open the heater and do such work therein as may be necessary, without disturbing the normal production schedule as determined by the fact that a group of heaters is generally involved.

*Safety features*

It will be apparent that in the event of failure of air pressure in the control system, the several air and steam lines to the pot heater will be closed and the exhaust from the bags opened, so that there will be established a "safe" condition. Any of the cycle controllers which may be operating at such a time will have their electrical circuits opened by one or other of the pneumatic switches, and will come to rest, necessitating completion of the cycle by hand. Now, as has already been set forth, the solenoid valve 100 will be released at any time the relay 109 is energized through the contact 77, and will act to shut off the control air; and in event of failure of the electric power supply the solenoid valve will of course rest in its closed position. Thus, should pneumatic, hydraulic or electrical supply fail, the system will immediately revert to a "safe" condition, with a minimum possibility of hazard to life and limb or of damage to the pot heater or its contents.

It will be observed that, once a cycle has been completed and the cycle controllers brought to rest in their normal starting positions, with hydraulic pressure still on the ram 13, the contact 78 will be closed; but since the relay 107 will have been released by the opening of the contacts of either the switch 154A or the relay 110 during the progress of the cycles, the contact 78 will not be a part of a complete circuit. Before this contact 78 can again perform its function of initiating the automatic part of the cycle it will be necessary that the contact 77 be closed, re-energizing the relay 107. Thus, it is rendered impossible for a batch of tires to be accidentally run through a second cure without releasing the molds.

If either of the cycle controllers A or C be in other than its normal position of rest, the pilot valve 51A or 51C will be opened, so that air pressure will be applied to the corresponding pneumatic switch, 251A or 151C, closing its contacts, so that current from the contact 77 in the instrument 75 will serve to energize the relay 109. This will cause the solenoid valve 100 to close and shut off control air, paralyzing the cycle. Thus, it is impossible to start a cure until both these controllers have been brought to their proper starting positions. In such an event it will become the duty of the operator to set each controller manually to its correct position, after which he may restore normal operating conditions by manually actuating the switch 106, which will release the relay 109 and reopen the control air supply valve 100.

I claim:

1. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; and means adapted at a predetermined temperature within the said processing vessel to energize the motor of the maintaining timing mechanism.

2. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; and automatically operating means for introducing the maintaining timing mechanism intermediate the initiatory and the restoration periods.

3. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; and means including a temperature-responsive controller device connected with the processing vessel adapted at a predetermined temperature within the said processing vessel to energize the motor of the maintaining timing mechanism.

4. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor and a multiplicity of cams driven thereby for controlling the action of the fluid-pressure operated means during the initiatory period and during the restoration period; maintaining timing mechanism, including a constant speed motor and a single cam driven thereby, for controlling the action of the fluid-pressure operated means during the processing period; and means adapted at a predetermined temperature within the said processing vessel to energize the motor of the maintaining timing mechanism.

5. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; and means to interrupt the action of the said maintaining timing mechanism until completion of the restoration period by the first-named timing mechanism.

6. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; and electromagnetic means to interrupt the operation of the initiatory control timing means in the event of failure of the control fluids, and/or the electric power.

7. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; an emergency timing mechanism; including a constant speed motor, for modifying the operations of the other timing mechanisms; and means to introduce the same in the event of an abnormal condition existing within the processing vessel.

8. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; an emergency timing mechanism, including a constant speed motor, for modifying the sequence of operations; a pressure measuring instrument in communication with one of the fluid supplies to the processing vessel and including a low contact for energizing the emergency timing means; and manual means associated therewith to by-pass its contact.

9. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; an emergency timing mechanism, including a constant speed motor, for modifying the sequence of operations and duration thereof; a pressure measuring instrument in communication with one of the fluid supplies to the processing vessel and including a low contact for energizing the emergency timing means; and manual means associated therewith to by-pass its contact.

10. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; an emergency timing mechanism for modifying the sequence and duration of action of the fluid-pressure operated means, including a constant speed motor, for controlling the operation of the fluid-pressure operated means independently of the first-named timing mechanism and the maintaining timing mechanism; and means to interrupt the action of the first-named timing mechanism prior to the termination of the operation of the emergency timing means.

11. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; an emergency timing mechanism for modifying the sequence and duration of action of the fluid-pressure operated means, including a constant speed motor, for controlling the operation of the fluid-pressure operated means independently of the first-named timing mechanism and the maintaining timing mechanism; and a controller adapted to close on the high contact the circuit to the motor for the first-named timing means and on its low contact determining re-starting of the motor.

12. System for automatically controlling a sequence of operations, of which some include changes in a variable magnitude, and embodying an initiatory period, a processing period and a restoration period, said system comprising a processing vessel; a plurality of fluid-pressure operated means, including fluid connections to different portions of the vessel, to vary the pressure existing therein and the fluids supplied thereto; timing mechanism for maintaining one of the fluid supplies to the processing vessel; temperature responsive means associated with the said processing vessel; a controller device operated thereby for controlling the operation of the timing mechanism; and a pressure-operated controller communicating with the said vessel for further controlling the operation of the timing mechanism.

13. System for automatically controlling a sequence of operations, of which some include changes in a variable magnitude, and embodying an initiatory period, a processing period and a restoration period, said system comprising a processing vessel; a plurality of fluid-pressure operated means, including fluid connections to different portions of the vessel, to vary the pressure existing therein and the fluids supplied thereto; timing mechanism for maintaining one of the fluid supplies to the processing vessel; temperature responsive means associated with the said processing vessel; a controller device operated thereby for controlling the operation of the timing mechanism, a pressure-operated controller communicating with the said vessel for further controlling the operation of the timing mechanism; and manual means associated with the pressure-operated controller to by-pass the operation of said controller.

14. System for automatically controlling a sequence of operations, of which some include changes in a variable magnitude, and embodying an initiatory period, a processing period and a restoration period, said system comprising a processing vessel; fluid-pressure operated means to admit fluids to the vessel and to relieve the vessel thereof; timing mechanism, including a constant speed motor, for controlling the action of the fluid-pressure operated means during the initiatory period and during the restoration period; maintaining timing mechanism, including a constant speed motor, for maintaining the action of the fluid-pressure operated means during the processing period; means adapted at a predetermined temperature within the said processing vessel to energize the motor of the maintaining timing mechanism; and electromagnetic and pneumatic interlocking means for correlating the performance of said timing mechanisms.

WILLIAM J. KERR.